Sept. 19, 1967 T. N. MELIN 3,342,361
PIVOTAL FORK ASSEMBLY FOR FORK-LIFT TRUCKS
Filed Oct. 5, 1964 2 Sheets-Sheet 1

INVENTOR.
THOMAS N. MELIN
BY
Christie, Parker & Hale
ATTORNEYS

Sept. 19, 1967     T. N. MELIN     3,342,361
PIVOTAL FORK ASSEMBLY FOR FORK-LIFT TRUCKS
Filed Oct. 5, 1964     2 Sheets-Sheet 2

INVENTOR.
THOMAS N. MELIN
BY Christie, Parker & Hale
ATTORNEYS

United States Patent Office 3,342,361
Patented Sept. 19, 1967

3,342,361
PIVOTAL FORK ASSEMBLY FOR FORK-LIFT
TRUCKS
Thomas N. Melin, Longview, Wash.
(5538 The Toledo-Naples, Long Beach, Calif. 90803)
Filed Oct. 5, 1964, Ser. No. 401,451
2 Claims. (Cl. 214—730)

This invention relates to fork-lift trucks, and, more particularly, to apparatus for shifting a load carried by the forks of the truck laterally of the chassis of the truck to enable the load to be spotted in a predetermined location when the truck is disposed adjacent the location but is slightly out of position relative to the location.

In using fork-lift trucks to stack articles for storage and the like, it is often desirable, and in many cases necessary, that an article carried by the truck be deposited in alignment with a foundation or with a partially complete stack. This is true whether or not the article is supported on a pallet which in turn is supported on the forks of the fork-lift truck.

For example, in sawmills green lumber is arranged in unit stacks which usually are of considerable length. Several of the stacks are arranged vertically for drying of the lumber contained therein. Fork-lift trucks are used to compose the large stacks. In making up these large stacks, it is desirable that the unit stacks be positioned so that the ends thereof are vertically aligned with the ends of the foundation. It is difficult, because of human errors in judgment, to properly position a fork-lift truck adjacent a partially complete lumber stack, or these errors in judgment are common because of the extreme lengths of such loads. Usually the truck operator positions the truck adjacent the center of the foundation only to find that the ends of the load are not aligned with the ends of the foundation. In the majority of cases, the truck will have been positioned only a small distance laterally of the ideal truck position. In order to properly deposit the load on the foundation or partially complete stack, then, the truck operator must yo-yo, i.e., back and turn, the truck to inch the truck in one direction or the other along the foundation. As a result, the proper stacking of lumber is difficult, time consuming and uneconomical process.

This invention provides apparatus for shifting a load carried by a fork-lift truck laterally of the chassis of the vehicle so that misalignment of the load relative to the position in which the load is to be deposited may be corrected. The inventive apparatus is simple, economic and effective. The apparatus has the feature that an existing fork-lift truck may be provided with the apparatus without increasing the length of the truck in a forward direction; such an increase in truck length decreases the load handling capacity of the truck. Moreover, fork-lift trucks provided with this invention are not special purpose trucks and therefore may be used in a conventional manner for other purposes.

Accordingly, in general terms, this invention has utility in a materials handling vehicle having a chassis and a pair of load supporting arms. The invention provides apparatus for moving a load laterally of the chassis. The apparatus includes means for mounting the load supporting arms relative to the chassis for rotation about spaced substantially horizontal axes. The apparatus also includes controllable means coupled between the load supporting arms and the chassis for rotating the arms in the same direction about the horizontal axes. Accordingly, a load carried by the vehicle and supported relative to the chassis by the arms is moved in the same direction relative to the chassis.

The above mentioned and other features of this invention are more fully set forth in the following detailed description of the invention taken in conjunction with the accompanying drawings wherein.

Figure 1:
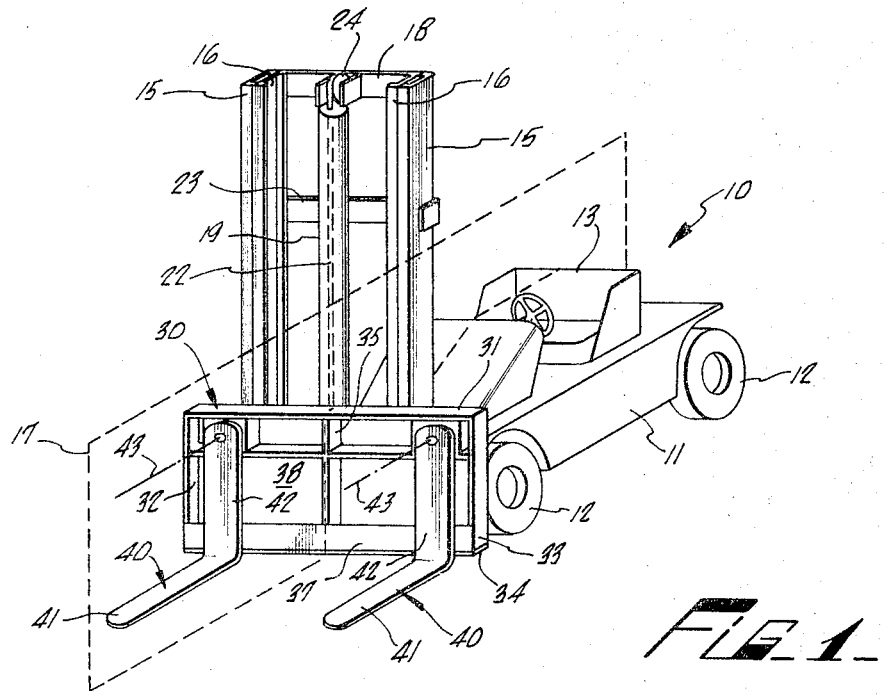
FIG. 1 is a perspective view of a typical fork-lift truck equipped with this invention.
Figure 3:
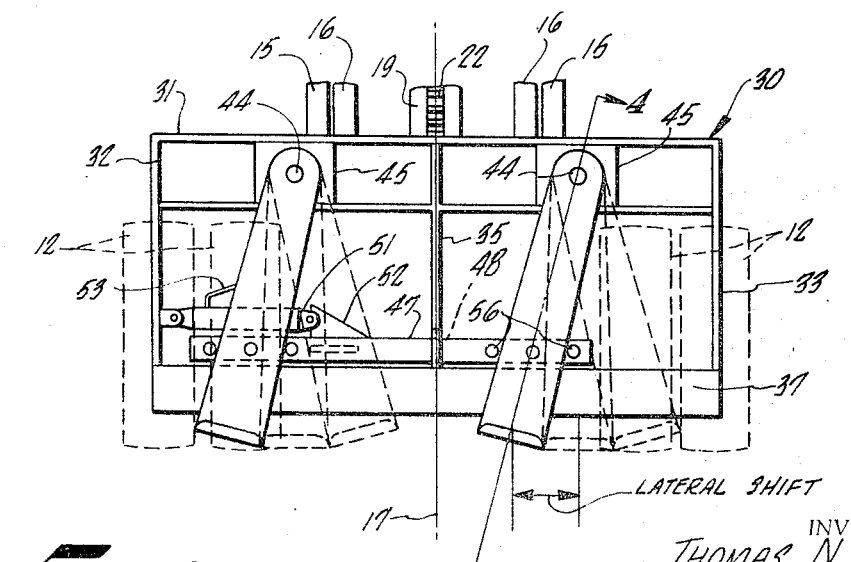
FIG. 3 is an enlarged front elevation view of the truck shown in FIG. 1.

FIG. 1 shows a materials handling vehicle 10, e.g., a fork-lift truck, having a chassis 11 to which a plurality of wheels 12 are mounted. An operator's station 13 is mounted to the upper portion of the chassis and includes suitable controls (not shown) for operating the vehicle. A vertical elevator 14 is mounted to the front end of the truck and includes a pair of vertical rails provided by an outer pair of channels 15 spaced apart tranversely of a longitudinal center plane 17 of the vehicle. Channels 15 open toward each other. A second pair of channels 16, also spaced apart transversely of center plane 17, are disposed between channels 15 and open toward each other. Each channel 16 is movably engaged with adjacent channel 15 by a plurality of wheels or the like carried by channel 16 and which ride between the flanges of adjacent guide channel 15. Channels 16 are connected together at their upper ends by a crosshead 18 to which is connected the upper end of an extensible ram 19, the other end of which is connected to truck chassis 11.

An elevator carriage 20 (see FIG. 2) is disposed between channels 16 and carries a plurality of rollers 21 which are disposed between the flanges of the channels so that the carriage is vertically movable relative to the vehicle chassis and is guided in such movement by the channels. A chain 22 has one end connected to the upper portion of the elevator carriage and has its other end connected to a cross bracket 23 which is connected between channels 15. The chain passes over a pulley 24 carried by crosshead 18 adjacent the upper end of ram 19. As the ram is extended, carriage 20 is moved vertically of elevator 14.

Those skilled in the art will understand that elevator 14 is but one of the many types of elevator structures provided in fork-lift trucks. Elevator 14 is shown merely to illustrate the environment in which the present invention finds utility. Accordingly, the present invention is not restricted to a particular elevator structure.

A fork apron 30 is mounted to elevator carriage 20 for movement vertically with the elevator carriage. The fork apron is a rigid structural framework which extends transversely of the vehicle. The apron includes a top plate 31, side plates 32 and 33, and a bottom plate 34. A center plate 35 extends between the top and bottom plates midway between the side plates along the vertical center plane of the vehicle. A pair of horizontal members 36 extend between the center plate and the side plates below top plate 31. A lifting fork bearing plate 37 extends across the front of the fork apron between the side plates immediately above bottom plate 34. A fork apron cover plate 38 extends from the upper edge of the bearing plate 37 to horizontal members 36.

Like elevator 14 described above, fork apron 30 is shown merely as an example of the many fork aprons which are provided in conventional fork-lift trucks to illustrate the environment in which this invention finds utility. Accordingly, this invention is not restricted to the specific fork apron structure shown and described.

A pair of load supporting arms 40, in the form of lifting forks, are mounted to vehicle chassis 11 via fork apron 30 and elevator carriage 20 and are vertically movable relative to the chassis. Preferably the load supporting arms are disposed on opposite sides of, and equidistantly from, the longitudinal center plane of the vehicle. As shown, each load supporting arm or lifting fork has a horizontal load engaging and supporting portion or tine 41 which extends forwardly from the lower portion of the fork apron. Each lifting fork also has a vertical portion 42 which extends upwardly from the rear end of the fork tine to adjacent the upper extent of the fork apron. The lower rear portion of the vertical leg of each fork member, i.e., the heel of the lifting fork, bears against bearing plate 37 so that the load imposed on the fork tine is transferred to the fork apron.

The lifting forks are mounted to the fork apron for rotation about a pair of substantially horizontal axes 43 which preferably are spaced equidistantly from and on opposite sides of vehicle longitudinal center plane 17. A horizontal stub axle 44 extends rearwardly from the upper end of each lifting fork and is rotatably engaged in a journal bearing assembly 45 mounted in the fork apron between the top plate 31 and horizontal members 36.

Figure 4:
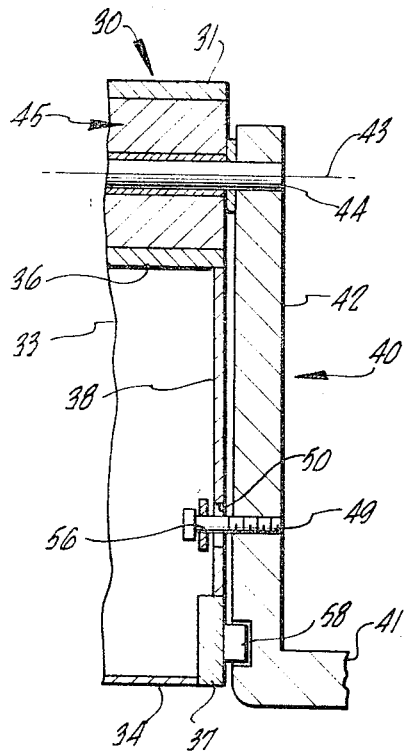
FIG. 4 is an enlarged cross-section view taken along line 4—4 in FIG. 3.

Means are provided for simultaneously rotating both lifting forks in the same direction about axes 43. Accordingly, a reciprocable connecting link member 47 extends transversely of apron 30 behind apron cover plate 38. The link member passes through an aperture 48 in apron central member 35 near the upper edge of fork bearing plate 37. The ends of the link member are pinned to the adjacent vertical portions of the lifting forks by bolts 49 which pass through slots 50 in apron cover plate 38. The bolts are threaded into the adjacent lifting forks as shown in FIG. 4. Preferably slots 50 are arcuately curved concentric to axes 43. A double acting hydraulic ram 51 has one end pinned to the fork apron. The other end of the ram is pinned to a bracket 52 mounted on the link member. Suitable hydraulic fluid supply ducts 53 and controls (not shown) connect the ram with a source of hydraulic fluid (not shown), such as the hydraulic pump provided for operating ram 19. Accordingly, the lifting forks are coupled to the chassis via the rams, the fork apron, and elevator 14.

Figure 2:
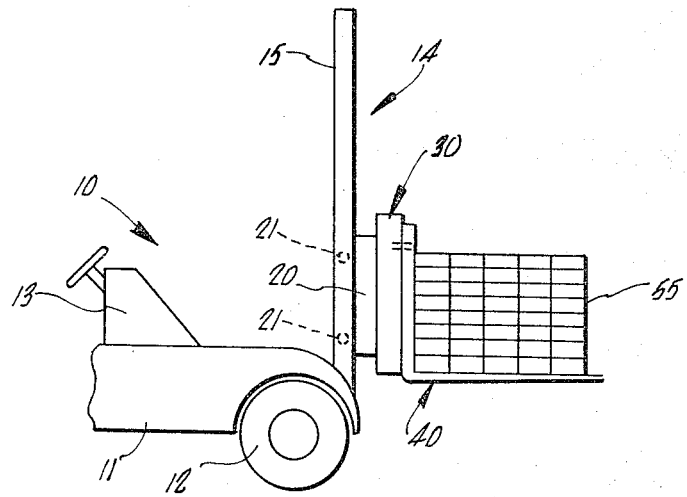
FIG. 2 is a side elevation view of the truck shown in FIG. 1.

As an aid to an explanation of the operation of the invention, let it be assumed that truck 10 carries a load such as stack of lumber 55 shown in FIG. 2 and that the truck is disposed adjacent a foundation for the load. Let it also be assumed that the truck is displaced laterally from the position in which the truck must be located in order to deposit the load on the foundation with the ends of the load in vertical alignment with the ends of the foundation. To avoid yo-yoing the truck into the proper position relative to the foundation, the apparatus described above is operated to shift the load laterally of the truck to align the end of the load with the end of the foundation. As noted above, forklift truck operators usually are sufficiently skilled that they can readily position the truck adjacent the load foundation within a few inches of the ideal truck location. Accordingly, it is necessary to shift the load only a few inches laterally of the truck. To accomplish this, ram 51 is actuated to move reciprocable connecting link 47 in the same direction laterally of the truck chassis as the direction in which the load must be moved. Such operation of the ram causes lifting forks 40 to rotate together in the same direction about axes 44. Accordingly, load 55 is shifted laterally of the carriage. It will be observed that such operation of the ram produces only linear motion of the load and does not cause the load to be rotated relative to the chassis.

It is preferred that ram 51 be in such a condition prior to the initial engagement of the lifting forks with the load that lifting fork portions 42 are disposed vertically.

Connecting link 47, ram 51, forks 40 and bearing assemblies 45 may be provided as an attachment apparatus for existing fork-lift trucks. The spacing between forks is not uniform from truck to truck. Accordingly, a plurality of apertures 56 are provided through each end of link 47 adjacent the ends of the link so that a given assembly may be used with several different types of forklift trucks. Bolts 49 are passed through the desired ones of these apertures into engagement with the lifting forks.

As ram 51 is operated, the heel of the lifting fork moves relative the fork bearing plate. In a preferred embodiment of this invention, a vertically oriented roller bearing 58 is mounted in each fork member opposite the fork bearing plate to engage the bearing plate. The roller facilitates movement of the fork members relative to the fork apron and enables a low capacity hydraulic ram to be used in the fork rotating mechanism.

Figure 5:
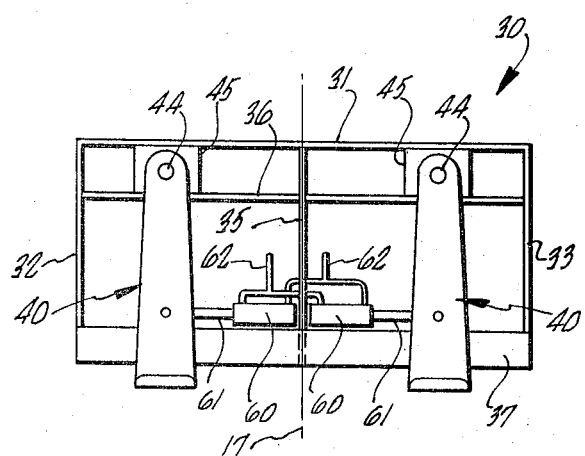
FIG. 5 is a front elevation view, with parts broken away, of a fork-lift truck provided with another embodiment of this invention.

FIG. 5 illustrates a second embodiment of this invention in which a pair of hydraulic rams 60 are provided for rotating the lifting forks. Each ram has a piston 61 which is pinned to a corresponding lifting fork at a location on the vertical portion of the fork spaced from the associated axis 43. The other end of each ram is pinned to fork apron central member 35. Suitable hydraulic fluid ducts 62 interconnect the rams with a source of hydraulic fluid (not shown) in such a manner that one ram is extended as the other ram is shortened. Accordingly, both lifting forks are caused to rotate in the same direction about axes 43 upon operation of the rams.

There has been described above a simple, effective and economic apparatus for providing a fork-lift truck with the capability for shifting a load carried by the forks laterally of the truck chassis. This apparatus, since the portions thereof which are not normally provided in a forklift truck are disposed within the fork apron, does not result in an extension of the overall length of the truck. The load carrying capacity of the truck thus is maintained. The apparatus has the further feature that it may be added to a conventional fork-lift truck without converting the truck to a special purpose vehicle.

The invention has been described in conjunction with the handling of a stack of lumber because the utility of the invention is readily apparent in such a context. Those skilled in the art will realize that the present invention has utility in the handling of other loads.

While this invention has been described above in conjunction with specific apparatus, this has been by way of example only and is not to be considered as limiting the scope of this invention.

What is claimed is:

1. In a fork-lift truck having a wheeled chassis, an elevator including a vertically movable fork apron, and a pair of lifting fork members carried by the apron, each fork member having a load bearing portion which extends forwardly of the fork apron for engaging and supporting a load and a vertical portion extending from the end of the load bearing portion adjacent the fork apron, the fork members being disposed substantially equidistantly from and on opposite sides of a longitudinal center plane of the chassis, the load bearing portions of the fork members extending substantially horizontally from the lower end of the fork apron, the improvement comprising apparatus for shifting a load supported by the fork members laterally of the truck chassis comprising means for rotatably mounting the upper end of each fork member vertical portion to the apron adjacent the upper end of the apron for rotation about a substantially horizontal axis, each axis being substantially fixed relative to the fork apron, a member pivoted between the vertical portions of the fork members at locations below said axes, and in a double acting hydraulic ram connected between the fork apron and the member.

2. In a fork-lift truck having a wheeled chassis, an elevator including a vertically movable fork apron at one end of the chassis, and a pair of essentially rigid lifting fork members carried by the apron, each fork member having a vertical leg disposed adjacent the side of the apron opposite from the chassis and an elongate horizontal leg rigidly connected to the vertical leg and extending substantially parallel to a longitudinal center plane of the chassis from the lower end of the vertical leg in a direction away from the apron, the horizontal legs of the fork members being arranged to be inserted under a load carried by the truck for supporting the load relative to the apron, the improvement comprising apparatus for shifting a load supported between fork members laterally of the truck chassis and comprising means mounting the upper ends of the fork member vertical legs to the apron for pendulous movement of said legs about substantially horizontal vertical axes substantially fixed relative to the apron, and fork moving means for moving corresponding parts of the fork members in the same selected direction relative to the apron about said axes upon operation thereof, the fork moving means being effective along a substantially horizontal line transversely of the longitudinal center plane and including a double acting ram arranged horizontally adjacent the lower end of the fork apron, a member pivoted between the fork member vertical legs adjacent the fork member horizontal legs, and means for connecting the ram between the fork apron and the member.

References Cited

UNITED STATES PATENTS

| | | | |
|---|---|---|---|
| 1,118,817 | 11/1914 | Gilman | 212—9 |
| 2,208,410 | 7/1940 | Carter | 5—81 |
| 2,234,851 | 3/1941 | Asper | 214—731 |
| 2,613,830 | 10/1952 | Ponnequin | 214—653 |
| 2,643,784 | 6/1953 | Turner | 214—731 |
| 3,002,639 | 10/1961 | Cavanagh | 214—730 X |
| 3,015,401 | 1/1962 | Bergstrom | 214—653 X |
| 3,184,088 | 5/1965 | Berge | 214—653 |
| 3,203,568 | 8/1965 | Quayle | 214—653 |

FOREIGN PATENTS 1,109,307   1/1956   France.

GERALD M. FORLENZA, *Primary Examiner.*

R. B. JOHNSON, *Assistant Examiner.*

UNITED STATES PATENT OFFICE
CERTIFICATE OF CORRECTION

Patent No. 3,342,361                           September 19, 1967

Thomas N. Melin

It is certified that error appears in the above identified patent and that said Letters Patent are hereby corrected as shown below:

Column 5, line 12, cancel "vertical".

Signed and sealed this 10th day of March 1970.

(SEAL)
Attest:

Edward M. Fletcher, Jr.
Attesting Officer

WILLIAM E. SCHUYLER, JR.
Commissioner of Patents